United States Patent [19]

Meikrantz et al.

[11] Patent Number: 4,995,916

[45] Date of Patent: Feb. 26, 1991

[54] METHOD OF RECOVERING HAZARDOUS WASTE FROM PHENOLIC RESIN FILTERS

[75] Inventors: David H. Meikrantz; Gary L. Bourne, both of Idaho Falls, Id.; John N. McFee, Albuquerque, N. Mex.; Bradley G. Burdge; John W. McConnell, Jr., both of Idaho Falls, Id.

[73] Assignee: The United States of America as represented by the United States Department of Energy, Washington, D.C.

[21] Appl. No.: 516,936

[22] Filed: Apr. 30, 1990

[51] Int. Cl.$^5$ .............................................. B08B 9/00
[52] U.S. Cl. ................................ 134/22.16; 134/22.1; 134/22.19; 252/626
[58] Field of Search ............ 252/626; 134/22.1, 22.16, 134/22.19

[56] References Cited

U.S. PATENT DOCUMENTS 3,089,167  5/1963  Jahn et al. .................... 134/22.19
4,061,480 12/1977  Frye et al. ........................ 252/626

Primary Examiner—Edward A. Miller
Assistant Examiner—Ngoclan Mai
Attorney, Agent, or Firm—Thomas G. Anderson; James W. Weinberger; William R. Moser

[57] ABSTRACT

The invention is a process for the recovery of hazardous wastes such as heavy metals and radioactive elements from phenolic resin filter by a circulating a solution of 8 to 16 molar nitric acid at a temperature of 110 to 190 degrees F. through the filter. The hot solution dissolves the filter material and releases the hazardous material so that it can be recovered or treated for long term storage in an environmentally safe manner.

7 Claims, No Drawings

METHOD OF RECOVERING HAZARDOUS WASTE FROM PHENOLIC RESIN FILTERS

CONTRACTUAL ORIGIN OF THE INVENTION

The U.S. Government has rights in this invention pursuant to Contract No. DE-AC07-76IDO1570 between the U.S. Department of Energy and EG&G Idaho, Inc.

BACKGROUND OF THE INVENTION

This invention relates to a method for recovering hazardous wastes embedded or trapped on phenolic resin filters. More specifically, this invention relates to a method of treating filter cartridges of phenolic resin material which may contain hazardous waste, to remove the filter cartridge and hazardous waste from the filter cartridge housing in a safe manner which will not expose the operators or the environment to the hazardous material.

Phenolic resin filters are described in U.S. Pat. Nos. 2,539,767 and 2,539,768 which issued to L. E. Anderson in January 1951, and incorporated herein by reference. Phenolic resins are very stable and inert to most environmental conditions. Because of these physical properties, filter cartridges of phenolic resins are available in a variety of filter sizes and with a wide range of filtering capabilities down to a single micron. These filter cartridges, enclosed in a reusable shell or cartridge housing of metal such as stainless steel, are often used for the removal of hazardous particulate matter from a variety of process streams and other solutions. These hazardous materials may include heavy metals such as Ni, Cd, Ag, As, Cr, Tl, Se, etc., as well as radioactive materials resulting from nuclear fuel reprocessing or other nuclear activities. For example, during the dismantling of the Three Mile Island (TMI) nuclear rector, it was to decontaminate the reactor cooling water before it could be removed from the reactor. As part of the decontamination process, the water was first passed through a series of phenolic resin filters encased in stainless steel housing, to remove insoluble radioactive particulate matter from the water before the water could be treated further. The contaminated filters cartridges and cartridge housings were placed in shipping casks and transported to temporary storage.

The problem then, is to provide permanent disposal of the hazardous material contained on the filters.

Disposal of the contaminated filters to a landfill is unsatisfactory because the hazardous material is not a permanent part of the filter and is susceptible to leaching from the filter material and, subsequently from the landfill, so that is could ultimately contaminate the ground water. Furthermore, the filters are shipped in a dry state so that removal of the filter cartridges from the cartridge holders can result in the release of a considerable quantity of heavy metal and/or radioactive material into the environment. This is hazardous not only to the environment, but to the personnel who are recovering the cartridges from the cartridge holders.

Furthermore, recovery of the hazardous material from the phenolic resin filters is desirable for several reasons. Some of the heavy metals, such as silver, have an intrinsic value which makes their recovery of interest. Other heavy metals and the radioactive wastes, as noted above, can cause long-term environmental problems if they are not disposed of in a manner that would preclude the waste, nuclear or heavy metal, from contaminating the groundwater or atmosphere at some time in the future.

It would be preferred to recover the filters containing the hazardous material from the filter housings in a remote manner so that it could be accomplished without endangering either the personnel performing the recovery operation or the environment. Recovery of the filter material and the hazardous waste contained thereon would then permit processing of the waste into a medium which could not only reduce the volume of the waste which must be stored, but would prevent release of hazardous material into the environment. This would eliminate the uncertainties associated with long term storage of materials of this type.

The difficulty however, is the removal of the phenolic resin filters containing the hazardous material from their cartridge housings in a environmentally safe manner and the recovery and separation of the hazardous waste from the phenolic filters. Since solvents are not effective for dissolving the phenolic resins, there has been no known method of effectively recovering these wastes from the phenolic filters, so that the wastes can be safely processed.

SUMMARY OF THE INVENTION

A method has been found for treating phenolic resin filter, whereby the filter is solubilized within the filter cartridge housing so the filter material can be removed from the cartridge housing in a remote manner. Any hazardous material will be removed from the housing with the filter material from which it can then be separated and recovered for reuse or be disposed of in an environmentally suitable manner, according to the type of waste involved. The invention, for the remote removal of phenolic resin filters from a housing containing the filter, consists of contacting the filter within the housing with an aqueous solution of about 8 to 12M nitric acid, at a temperature from about 110° to 190° F., maintaining the contact for a period of time sufficient to solubilize the phenolic material within the housing, and removing the solubilized phenolic material from the housing, thereby removing the filter cartridge from the housing. Any hazardous or other waste material can then be separated from the filter material by chemical or other means.

The process of the invention is advantageous in that it can be operated in a remote manner so that hazardous waste contaminated filters can be removed from the filter housing and the heavy metals and/or radioactive material can be processed with a greatly reduced risk of human exposure. Furthermore, because the process is a wet process, the risk of release of hazardous material to the environment is virtually eliminated. Once the filter material together with the waste have been separated from the filter housing, it is amenable to numerous process options. For example the recovered waste can be treated by solvent extraction or complexation for the selective recovery of valuable radioisotopes, special nuclear materials, or valuable heavy metals. Materials which must be stored can be readily incorporated into a grout or glass for environmentally safe long-term immobilization.

It is therefore one object of the invention to provide a method for solubilizing phenolic resins.

It is another object of the invention to provide an improved method for remotely recovering phenolic resin filter cartridges from cartridge holders.

It is yet another object of the invention to provide a method for recovering hazardous materials present on phenolic resin filters.

It is still another object of the invention to provide a method for recovering phenolic resin filter cartridges containing hazardous materials from filter housings in an environmentally safe manner.

Finally, it is the object of the invention to provide a method for solubilizing phenolic resin filter cartridges containing hazardous material so that the filter material and the hazardous material can be remotely removed from the filter housing containing the cartridge.

DETAILED DESCRIPTION OF THE INVENTION

These and other objects of the invention for the removal of phenolic resin filters cartridges containing hazardous waste from filter cartridge holders may be met by circulating an aqueous solution of nitric acid through the filter, said solution being from 8 to 12M in nitric acid, at a temperature of 160° to 190° F., maintaining the flow of the nitric acid solution through the filter for a period of at least 2 and ½ hours to solubilize the filter material and release the hazardous waste, and separating the solubilized filter material and the waste from the filter housing, thereby recovering the filter and the hazardous waste from the filter housing.

The aqueous solution may vary in nitric acid content from about 8 to about 16M in concentration. The temperature of the solution by also vary from about 110° to 190° F. Solution temperatures below about 110° F. have little or no effect on the phenolic resin material no matter how strong the acid concentration. Similarly, acid concentrations below 5M have no effect on the phenolic resin material until the temperature reaches 190° F. Acid concentrations up to 10M have been found to have no short term effect on the filter at ambient temperature. Nitric acid concentrations above 10M, at ambient temperatures, will soften but not break down the filter material. Ideally the temperatures may range from about 110° to 190° F., while the nitric acid concentration may range from 8 to 16M. Dissolution times will vary depending upon the acid concentration and temperature, varying (for a given amount of filter material) from 3 hours at 110° F. at 16M acid to 7 minutes at 190° F. and 16M nitric acid. Since the reaction at 190° F. is quite vigorous, the preferred conditions vary from about 160° to 190° F. at an acid concentration of 8 to 10M. This provides for reasonably rapid dissolution of the filter material without the hazard of the reaction getting out of control.

Preferably the acid solution is circulated through the phenolic resin so that the material is continuously contacted with fresh acid solution. Most preferably the flow of solution through the filter is the reverse of the normal pattern of flow through the filter. While the rate of flow of solution through the filter is not critical, a minimum rate of about 100 ml/minute has been found satisfactory. The ratio of solution to resin must be an amount sufficient to dissolve the resin and release the hazardous material. A minimum ratio of about 2 liters of solution to 100 gm resin was found satisfactory.

Preferably the filters remain in the cartridge to facilitate circulating the solution through the filter and to eliminate the release of hazardous material to the environment during removal. Since the filter housings are metal, usually stainless steel, there is no problem with the effect of the hot concentrated nitric acid on the container. Other housing materials may require that acid concentration and/or temperatures be modified in order to prevent problems with container materials.

Preferably, circulation of the acid solution through the filter is continued until the filter has completely dissolved. This permits the filter to be completely and easily removed from the filter housing with the solution, so that the housing can be reconditioned for reuse.

Once the hazardous material has been recovered from the filter material, it can be concentrated and treated to place it into a form appropriate for the particular type of waste material. For example, low levels radioactive wastes may be neutralized with alkali and mixed into a cement or grout for long term storage in a land fill or other appropriate storage facility depending upon the level of radioactivity. Certain metal ions may be adsorbed on an appropriate clay before mixing with concrete or other appropriate storage media which will prevent leaching before placing in a land fill.

The following Examples are given to illustrate the process of the invention and are not to be taken as limiting the scope of the invention which is set forth in the appended claims.

EXAMPLES

A CUNO Micro-Klean Cartridge Series G78W8 employed for this test measures $2\frac{1}{2}''\times 9\frac{3}{4}''$ and weighed 110 g. Dissolution was made within the standard CUNO stainless steel housing. Stainless steel was used for the entire acid-wetted system. The acid solution was pumped in reverse flow from the normal direction through the filter. As such, acid flowed into the center of the cartridge and out through the filter toward the housing. This was done to ensure that filtered solids were flushed from the housing prior to filter dissolution, and important factor where loadings could cause blockage of tubing and valves. Test conditions included a flow rate of 100 ml/min recirculation (1.6 gal/min) and 10M $HNO_3$ solvent at 160° F. under continuous recirculation. The total system volume was 2.5 liters.

A second test was identical to the first except the filter was loaded with 177 g (dry weight) of Susquehanna River silt, the average loading of actual TMI waste filters.

The results of both tests indicate that this type of filter cartridge can be dissolved in-situ in approximately 2–3 hours under the conditions previously stated. A total of 7 liters of 10M $HNO_3$, three reservoir fillings, and 2 liters of $H_2O$ rinse was used in Test #1. The entire filter dissolved and was pumped into the reservoir without plugging or noticeable back pressure on the system. The resultant waste solution was brown in color and contained an organic scum which continued to digest after the solution was allowed to cool. Total duration of the test was 5 hours.

The second test, using silt loaded filter, was quite similar to the first except that the silt was rapidly backwashed to the reservoir creating a murky acid solution. Less organic scum was observed on the reservoir surface during this test. After two hours, a three-way valve was switched to direct flow into the bottom of the filter housing. This caused an additional burst of silt which restricted flow to the reservoir by 50%. The test was continued for an additional hour but no further indication of filter dissolution was observed. It was difficult to observe dissolution progress throughout the second test due to the large quantity of silt. However, upon opening the housing for inspection, all filter material was dissolved and pumped to the reservoir. A layer of sludge from silt was found in the bottom of the housing which appeared to include little if any filter material. The total volume of 10M HNO$_3$ used in the second test was 6 liters. No water rinse was made because of the restricted flow. The total test duration was 5½ hours.

It can be seen from the preceding Examples and discussion, that the process of the invention can be successfully used to dissolve phenolic resins and to remove phenolic resin filter cartridges which may contain hazardous and radioactive wastes from cartridge housings in a safe and hazard-free manner. Wastes recovered in this manner can be easily disposed of in a safe and environmentally suitable manner.

The embodiment of the invention in which an exclusive property or privilege is claimed is defined as follows:

1. A method for the remote removal of a filter cartridge of phenolic material from a cartridge housing containing the filter comprising:
   contacting the phenolic filter in the housing with an aqueous solution containing from about 8 to 16M nitric acid at a temperature of from about 110° to 190° F.,
   maintaining the contact for a period of time sufficient to solubilize the phenolic material within the housing, and
   removing the aqueous solution containing the solubilized phenolic material from the housing, thereby separating the filter from the housing.

2. The method of claim 1 wherein the filter contains hazardous material.

3. The method of claim 2 wherein contact is made by circulating the aqueous solution through the filter material.

4. The method of claim 3 where the circulation of the aqueous solution through the filter is the reverse of the normal flow pattern through the filter.

5. The method of claim 4 wherein the hazardous material is one or more selected from the group consisting of Cr, As, Ag, Ba, Pb, Tl, Se, and radioactive elements.

6. The method of claim 5 wherein the aqueous solution is from 8 to 10 molar in nitric acid and the temperature of the solution is from 160° to 190° F.

7. A method of removal and recovery of hazardous material from a phenolic resin filter in a filter cartridge housing comprising:
   circulating an aqueous solution of 8 to 12M nitric acid through the housing, said solution being at a temperature of 160° to 190° F.,
   maintaining the circulation for a period of time sufficient to solubilize the filter material and release the hazardous material,
   removing the solubilized filter material and hazardous material from the housing, and
   separating the hazardous material from the solubilized filter material.

* * * * *